United States Patent Office 3,549,678
Patented Dec. 22, 1970

3,549,678
PROCESS FOR MAKING ORGANOMETAL COMPOUNDS OF HEAVY METALS BY MEANS OF ORGANOTRIFLUOROSILANES
Richard Muller, Radebeul, Sigrid Reichel, Dresden, and Christian Dathe, Radebeul, Germany, assignors to Institut fur Silikon- und Fluorkarbon-Chemie, Radebeul, Germany
No Drawing. Filed Dec. 27, 1967, Ser. No. 693,715
Int. Cl. C07f 1/10, 3/12, 7/24
U.S. Cl. 260—430                                    3 Claims

ABSTRACT OF THE DISCLOSURE

Process for making organometal compounds of heavy metals by reacting salts of heavy metals directly with organotrifluoro directly with organotrifluorosilanes with the exclusion of acids forming organofluorosilicic acid and of alkali metal- or ammonium fluorides, by heating the heavy-metal compounds with an excess amount of the organotrifluorosilanes.

It is known that e.g. sodium-, potassium-, and ammonium-organopentafluorosilicates can be used in aqueous soluitons as alkylating, alkenylating and arylating agents for heavy-metal salts. It is further known the the process may be simplified by organotrifluorosilanes being reacted with salt solutions of heavy metals in the presence of preferably aqueous acids, more particularly fluoric acid. In the process, the formation of the above-mentioned complex salts is hypothetically assumed, which permits the same reactions to be carried out as are performed with the organopentafluorosilicates. When the reaction with organotrifluorosilanes is effected in aqueous solutions without addition of acid, the reaction leads to very poor yields only.

It is the object of the present invention to provide a process which permits to make organometal compounds of heavy metals by simple procedures and in good yields without the addition of any acids forming organofluorosilicic acids or addition of alkali metal- or ammonium fluorides forming organofluorosilicates.

Other objects and advantages of the present invention will become apparent from the following detailed description.

The metalorganic compounds prepared according to the invention are useful as pesticides and as intermediates in organic syntheses.

It has now been found that it is possible to accomplish the above objects and to obtain the desired organometal salts of heavy metals in a smooth reaction and in yields over 90% by directly heating them with excess amounts or organotrifluorosilanes without the above-mentioned additions, i.e. without the formation of the mentioned complexes or their complex acids.

For instance, when phenyltrifluorosilane and triphenyllead fluoride or diphenylantimony fluoride are boiled, tetraphenyllead or triphenylantimony, respectively, will be formed quantitatively, while $SiF_4$ escapes. The course of the reaction is illustrated by the formulae below:

$(C_6H_5)_3PbF + C_6H_5SiF_3 \rightarrow (C_6H_5)_4Pb + SiF_4$ (1)

$(C_6H_5)_2SbF + C_6H_5SiF_3 \rightarrow (C_6H_5)_3Sb + SiF_4$ (2)

Lead[IV] acetate reacts with phenyltrifluorosilane likewise with formation of tetraphenyllead. With mercury[II] acetate, diphenylmercury is formed in a yield of more than 90%. Other SiC bonds react according to Equations 1 and 2. For instance, when reacting trifluorosilyl-trichloromethane with diphenylantimony fluoride, trichloromethyl-diphenylantimony is obtained with the equivalent amount of $SiF_4$ escaping.

$F_3SiCCl_3 + (C_6H_5)_2SbF \rightarrow (C_6H_5)_2SbCCl_3 + SiF_4$ (3)

When salts of such heavy-metals are used, as e.g. silver or copper, which form unstable organometal compounds, decomposition of the organometal compounds formed by the reaction will occur with reduction of the metal cation orginally present, and formation of hydrocarbons. Thus upon heating of silver carbonate with phenylfluorosilane, silverphenyl is formed which is decomposed in a familiar manner forming diphenyl and metallic silver. The reaction can be utilized for the reduction of such heavy metals and the formation of hydrocarbons.

No addition of solvents is necessary in the process according to the inveniton, but it is not harmful, in some cases even desirable. All conventional organic solvents may be used.

Thus, e.g., trifluorosilyl-trichloromethane reacts with antimony[III] fluoride in ether by forming tris-trichloromethyl antimony, $$3F_3SiCCl_3 + SbF_3 \xrightarrow{\text{ether}} (Cl_3C)_3Sb + 3SiF_4 \quad (4)$$

If glacial acetic acid is used as solvent, it is possible to stop the reaction at a desired stage. For instance, when mercury[II] acetate is reacted with phenyltrifluorosilane in glacial acetic acid, the formation of phenylmercury acetate will be quantitative.

The metalorganic compounds prepared according to the invention may be used as pesticides and as intermediates in organic syntheses.

In the following, the invention will be more fully described in a number of examples which are given by way of illustration and not of limitation. Many changes in the details may be made without departing from the spirit of the invention.

EXAMPLE 1

10 g. triphenyllead fluoride $(C_6H_5)_3PbF$ were refluxed for 16 days with 40 g. phenyltrifluorosilane $C_6H_5SiF_3$ while stirring. After distilling off the excess of phenyltrifluorosilane, and washing the residue with chloroform, 12 g. tetraphenyllead (98% of the theoretical amount) were obtained. Melting point 228° C. (literature: 226 to 228° C.).

EXAMPLE 2

10 g. diphenylantimony fluoride $(C_5H_5)_2SbF$ were boiled with 36 g. phenyltrifluorosilane $(C_6H_5)SiF_3$ for 40 hours and the excess of phenyltrifluorosilane is distilled off. The residue, which mainly consisted of $(C_6H_5)_3Sb$, was dissolved in chloroform, and chlorine was introduced in order to convert antimony into pentavalent form. When the solution was concentrated by evaporation, white crystals of $(C_6H_5)_3SbCl_2$, triphenylantimonydichloride with a melting point of 142° C. were precipitated (literature: 143° C.; Beilstein 10, p. 891). A mixture of this compound with a specimen of triphenylantimonydichloride made according to another method showed no melting point depression, which indicated that the reaction product is the identical compound. The conversion was almost quantitative.

EXAMPLE 3

To 137 g. diphenylantimony fluoride $(C_6H_5)_2SbF$ were slowly added drop by drop 139 g. trifluorosilyl-trichloromethane $Cl_3CSiF_3$ in an apparatus comprising a 500 ml. three-neck flask with stirrer, dropping funnel, thermometer and intensive cooler having two traps for the product, one of which was cooled with solid $CO_2$, the other with liquid oxygen. Nitrogen was introduced and at a temperature of about 15° C. practically quantitative splitting off of $SiF_4$ occurred (48 g., 90% of the theoretical amount). The reaction product was a white mash (165 g., 90% theoretical amount) from which fine white crystals were obtained with methanol. Melting point 145° C.

Analysis of the stable reaction product at room temperature:

Calc. for $(C_6H_5)_2SbCCl_3$ (percent): C, 39.60; H, 2.56; Sb, 30.88. Found (percent): C, 38.63; H, 2.71; Sb, 31.76.

EXAMPLE 4

In the same apparatus as described in Example 3, 203 g. trifluorosilyl-trichloromethane $F_3SiCCl_3$ were dissolved in 150 ml. of dry ether and thereto were added drop by drop 60 g. $SbF_3$ in 60 ml. ether within 20 minutes at $-20°$ C. while stirring. Yellow coloring set in immediately, and upon slow heating to 5 to 10° C., splitting off of 95 g. $SiF_4$ (91% of the theoretical amount) took place. Upon standing overnight, bright yellow crystals of tristrichloromethyl antimony precipitated $(Cl_3C)_3Sb$ (Cl: found 65.7%, calc. for $(Cl_3C)_3Sb$: 66.91%). The crystals are very sensitive and decompose already at room temperature, in spite of the exclusion of air and moisture.

If the $Cl_3CSiF_3$ without solvent was added to a very large excess amount of $SbF_3$, or if the preceding $Cl_3CSiCl_3$ was added with a small amount of benzene to a very large excess amount of $SbF_3$, and the mixture was heated to about 200° C. in both cases, there was an additional exchange with F-atoms of the Cl-atoms linked to the C-atom. Subsequent hydrolysis of the reaction products yielded as gaseous component a mixture of $CHCl_2F$, $CHClF_2$, and $CHF_3$ (about 20% calculated on the trichloromethyl-trihalogensilane used) which gas mixture was determined by gas chromatography.

EXAMPLE 5

44 g. leadtetraacetate $Pb(OOCCH_3)_4$ were refluxed while stirring with 162 g. phenyltrifluorosilane $C_6H_5SiF_3$ whereby $SiF_4$ escaped. After distillation of excess phenyltrifluorosilane (last traces partly in vacuo) there remained 36 g. residue (70% of the theoretical amount). The tetraphenyllead $(C_6H_5)_4Pb$ extracted therefrom with benzene had a melting point of 226° C.

EXAMPLE 6

64 g. phenyltrifluorosilane $C_6H_5SiF_3$ were heated with stirring with 32 g. mercury$^{II}$ acetate $Hg(OOCCH_3)_2$. At about 60° C. intense gas development occurred. Upon heating under reflux, the salt finally dissolved. After distilling off the excess phenyltrifluorosilane, the residue solidified. Recrystallized from alcohol, and dried on a clay plate, 65 g. diphenylmercury $(C_6H_5)_2Hg$ were obtained (92% of the theoretical amount), melting point 120° C. (liter: 122° C.).

EXAMPLE 7

To 32 g. mercury$^{II}$ acetate $Hg(OOCCH_3)_2$ 50 g. glacial acetic acid were added and 32 g. phenyltrifluorosilane $C_6H_5SiF_3$ added drop by drop while stirring. Intense development of gas took place immediately. Solvent was distilled off together with excess phenyltrifluorosilane, partly in vacuo, and there remained 33 g. (98% of the theoretical amount) of pure white phenylmercury acetate $C_6H_5HgOOCCH_3$, melting point 145° C. (liter: 148° C.).

EXAMPLE 8

13.7 g. $(Ag_2CO_3$ were heated, while stirring, in an oil bath with 16.2 g. phenyltrifluorosilane $C_6H_5SiF_3$. At about 80° C., $CO_2$ and $SiF_4$ were split off, while the mixture turned black ($SiF_4$ was determined as $(NH_4)_2SiF_6$: found 63.3% F, calc. 63.99%). After three hours the mixture was filtered with suction. The remaining residue was washed with methylene chloride and consisted of silver (11 g., 100%) slightly contaminated with some siloxanes; purification was easily achieved by evaporation with fluoric acid. Diphenyl in an amount of 7.5 g. (97% of the theoretical) crystallized from the methylene chloride solution, its identity being established by the melting point.

EXAMPLE 9

110.5 g. basic copper carbonate of about the following composition $CuCO_3.Cu(OH)_2$ were heated gradually to about 120° C., while stirring in 325 g. phenyltrifluorosilane $C_6H_5SiF_3$. At 70 to 80° C., $CO_2$ development set in (determined as $BaCO_3$) and $SiF_4$ (determined as $$(NH_4)_2SiF_6$$

found 63.4% F., calc. 63.99%). The reaction mixture, which was solid after cooling, was dissolved in methylene chloride and filtered with suction, and the residue extracted with chlorobenzene.

After concentration of the solution, 92 g. diphenyl crystallized, i.e. 60% of the phenyltrifluorosilane used, which could be purified by recrystallization from methanol and was identified by the melting point (67° C.).

EXAMPLE 10

46 g. silver oxide were heated with 162 g. phenyltrifluorosilane for 2 hours to a temperature of 70 to 100° C.; $SiF_4$ development set in and obtained were 28 g. diphenyl (melting point 68° C.) amounting to 91% of the theoretical value, as well as 41.5 g. (98% of the theoretical value) of metallic silver.

EXAMPLE 11

162 g. phenyltrifluorosilane were slowly added drop by drop to 44 g. mercury$^{II}$ oxide while stirring. Heat was developed by exothermic reaction and 41.5 g. (99% of the theoretical value) of $SiF_4$ escaped. The reaction was carried out to completion by heating the mixture in an oil bath to 200° C. By distillation in vacuo the excess amount of phenyltrifluorosilane was driven over first, whereafter 70 g. (99% of the theoretical value) of diphenyl mercury followed (melting point 123° C. in toluene ethanol 1:5). As residue of the distillation there remained an oily phenylfluorosiloxane.

What we claim is:

1. A process for making organometal compounds of heavy metals selected from the group consisting of lead, antimony, mercury, silver and copper, which comprises the steps of reacting salts of the metals directly at elevated temperatures with an excess amount of phenyl-, alkyl- or halogenated alkyl-trifluorosilanes with the exclusion of acids, forming with trifluorosilanes the respective fluorosilicic acids, and with the exclusion of alkali-metal fluorides or ammonium fluoride, forming the respective fluorosilicates.

2. The process as defined in claim 1, wherein a solvent is used for carrying out the reaction.

3. The process as defined in claim 2, wherein the solvent used is glacial acetic acid.

References Cited

UNITED STATES PATENTS

| | | | |
|---|---|---|---|
| 2,502,222 | 3/1950 | Kaplan et al. | 260—434 |
| 2,985,675 | 5/1961 | Blitzer et al. | 260—437 |
| 3,061,647 | 10/1962 | Jenkner | 260—437X |
| 3,072,697 | 1/1963 | Jenkner | 260—437 |
| 3,401,186 | 9/1968 | Müller et al. | 260—430 |

TOBIAS E. LEVOW, Primary Examiner

H. M. S. SNEED, Assistant Examiner

U.S. Cl. X.R.

260—433, 434, 437, 438.1, 446